Jan. 20, 1942.  A. A. WARNER  2,270,397
UNIVERSAL JOINT
Filed Sept. 12, 1940
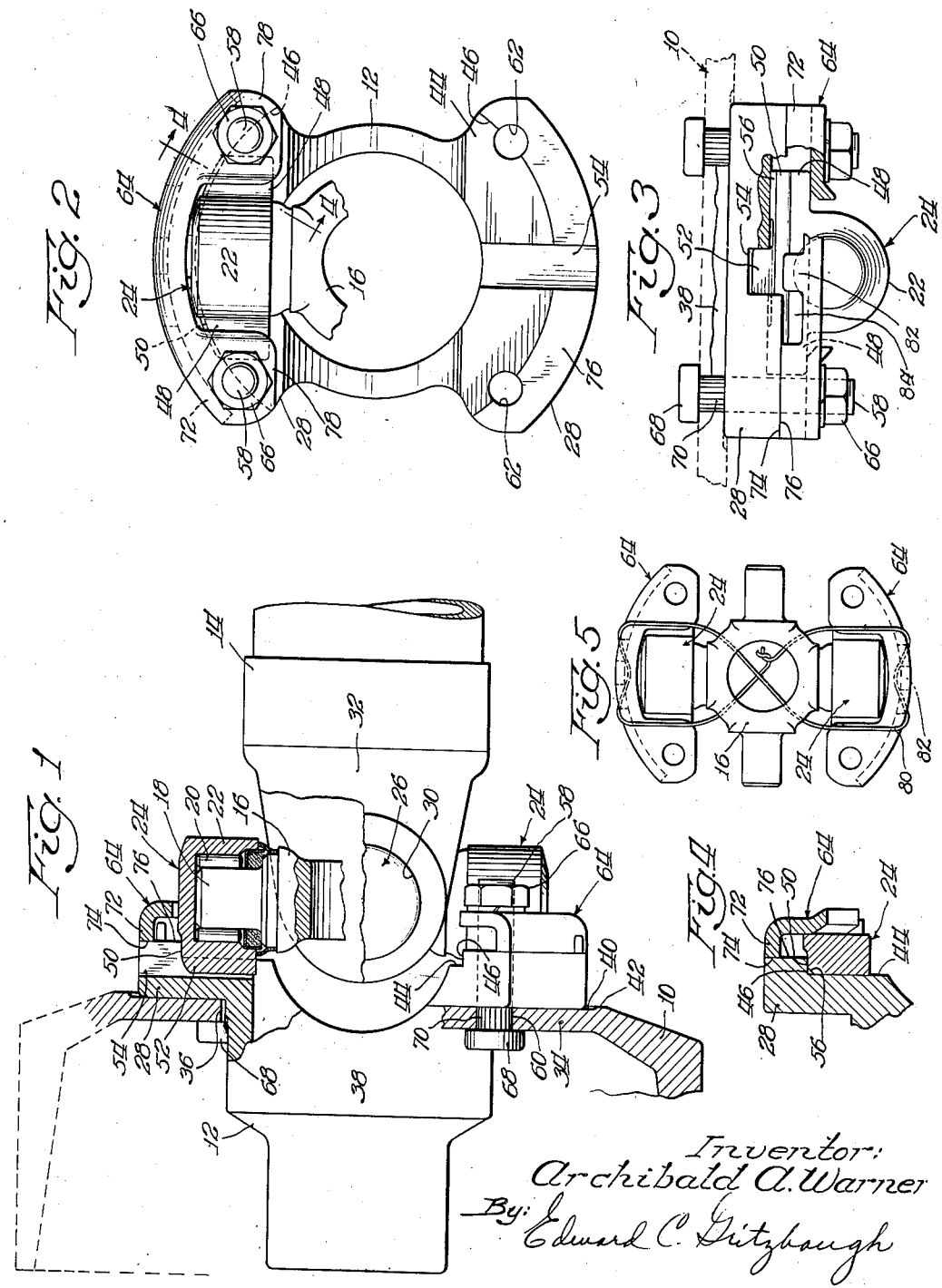
Inventor:
Archibald A. Warner
By Edward C. Gitzbaugh
Atty.

Patented Jan. 20, 1942

2,270,397

UNITED STATES PATENT OFFICE 2,270,397

UNIVERSAL JOINT

Archibald A. Warner, Detroit, Mich., assignor to Borg-Warner Corporation, a corporation of Illinois Application September 12, 1940, Serial No. 356,518

9 Claims. (Cl. 64—17)

This invention relates to universal joints of the type wherein torque is transmitted from one shaft mounted yoke member to another through a spider having trunnions that are journalled in bearing cups detachably secured to the respective yokes and having piloting connections therewith for accurately locating the bearing cups in assembled relationship. The general object of the invention is to provide a universal joint of this type, one yoke of which may be attached to a brake drum of the type employed in vehicles having propeller shaft parking brakes.

In constructing the propeller shaft assembly, it is desirable to assemble the brake drum to the transmission of the vehicle prior to assembling the universal joint on the brake drum.

An object of the invention then is to provide a universal joint and brake drum assembly which can be readily assembled under these conditions.

More specifically, the invention aims to provide a universal joint and brake drum assembly which can be thus assembled, and wherein the securing elements by means of which the bearings are attached to yoke arms, serve also to attach the yoke to the brake drum. To this end, the invention provides an arrangement wherein the securing elements are adapted to temporarily hold the brake drum and yoke assembled prior to attachment of the bearing cups.

Another object of the invention is to provide a universal joint and brake drum assembly of the type indicated, wherein the securing elements are placed far enough apart in their respective pairs so as to give adequate clamping of the drum to the yoke.

Another object of the invention is to provide such an assembly wherein the securing elements are so spaced with reference to the bearing as to give adequate room for applying the securing elements without interference with the cup portion of the bearing.

Another object of the invention is to provide a universal joint assembly of the type indicated wherein the adequate spacing of the securing elements is achieved without increasing the overall dimension of the bearing.

The foregoing objects are achieved by employing bolts which are extended through the web of the brake drum from the forward side thereof in such spaced relation as to clear the ends of the attaching ears of the bearings, and clamping the bearings to the yoke by means of clamp plates which are arched around the bearing cups, overlap the bearing ears and are secured thereagainst by nuts threaded upon the ends of the bolts which project through the clamp plates. The yokes and bearings are provided with co-acting piloting means and the clamp plate cooperates with the trunnion spider in maintaining the bearings in such piloting engagement.

Other objects, the advantages and uses of the invention will become more apparent after reading the following specification and claims, and after consideration of the drawing forming a part of the specification, wherein:

Fig. 1 is a side elevation, partly in section, of a universal joint and brake drum assembly embodying the invention;

Fig. 2 is a transverse elevation of the same;

Fig. 3 is a plan view of the same, parts being broken away and shown in section;

Fig. 4 is a detailed sectional view of the same taken on the line 4—4 of Fig. 2; and Fig. 5 is a plan view of a spider and bearing assembly as prepared for shipping and assembling purposes.

As an example of one form of which the invention may be embodied, I have shown in the drawing a portion of a motor vehicle propeller shaft assembly including a brake drum 10, a pair of universal joint fittings or yokes 12 and 14, each being adapted to be mounted on the end of a respective shaft, and a spider 16 connecting the yokes 12 and 14 for the transmission of torque therebetween. The spider 16 is formed with four trunnions 18, journalled through the medium of antifriction rollers 20 in bearing cup portions 22 of bearings 24 and 26, respectively. The bearings 24 are attached to the yoke arms 28 of the yokes 12, and the bearings 26 are mounted in sockets 30 in the yoke arms 32 of the yoke 14. The present invention deals particularly with the mounting of the bearings 24 on the yoke arms 28 and the attachment of the yoke 12 to the brake drum 10.

The brake drum 10 has a web portion 34 provided with a central opening 36 through which the hub 38 of the yoke 12 extends. The forward faces of the yoke arms 28 are fitted against the rear face 40 of the web 34. The outer extremities of the arms 28 are arcuate in shape to conform to the contour of the brake drum, which may have a slight bead 42 formed by the machining of the rear face 40 of the web.

The rear faces of the yoke arms 28 are recessed as at 44 to provide arcuate piloting shoulders 46. Each bearing 24 has integral attaching ears 48, the radially outer extremities of which are formed with arcuate piloting shoulders 50 which fit the piloting shoulder 46, and are adapted to be maintained in contact therewith in the assembled joint. The intermediate region of the bearing opposite the cup portion 22 is formed with a key 52 which fits into a keyway 54 in the yoke arms 28. The key forms the torque transmitting connection between the bearing and the yoke and the piloting shoulders determine the radial position of the bearings.

The yoke 12, bearings 24 and brake drum 10, are secured together in assembled relationship by bolts 58 which extend through openings 60 in the web 34, through openings 62 in the yoke arms 28, and through corresponding openings in a pair of clamp plates 64 which are clamped against the ears 48 of the bearings by nuts 66 threaded onto the ends of the bolts 58. The heads 68 of the bolts are disposed within the brake drum 10, the portions of the bolts which extend through openings 60 being narrow as at 70 and have a tight driven fit with the openings 60. Thus, the bolt may be assembled in the brake drum, projecting rearwardly therefrom to receive the yoke 12. In the assembling operation, the bolts are first driven through the openings 60, projecting rearwardly from the brake drum. The yoke 12 is then slipped over the projecting bolts, thus making a single unit of the drum and yoke which may then be assembled to the transmission of the vehicle. Subsequently, the spider and the bearing assembly of the universal joint may be applied to the rear faces of the yoke arms 28, the bearings being held in spaced relationship by the spider 16. In order to facilitate this assembling operation, the shoulders 50 of the bearings may be chamfered as at 56, the chamfers 56 giving a piloting action to guide the bearings into assembled relationship between the shoulders 46 of the opposed arm 28.

The clamp plates 64 are then slipped over the ends of the bolts and the nuts 66 are applied, thus securing the bearings in assembled relationship, the clamp plates preventing axial movement of the bearings away from the yoke arms 28, the piloting shoulders 46 preventing radially outward movement of the bearings, and the spider preventing radially inward movement of the bearings.

The clamp plate 64 is curved to conform to the periphery of the arm 28 and is provided with a peripheral flange 72 having a machined edge 74 which abuts the machined face 76 of peripheral region of the arm 28 beyond the shoulder 46. The end regions of the clamp plate are extended radially inwardly to form a pair of spaced arms 78, the inner regions of which are substantially parallel and adapted to overlap the ears 48 and to embrace between them the bearing cup portions 22 of the bearings.

These inner regions engage the ears 48 for clamping the bearing securely in assembled position.

In addition to the features of the assembled joint described above, the invention provides for maintaining the spider, the clamp plate, and the corresponding bearing cup in a unit assembly suitable for shipping and facilitating assembling of these parts in the complete assembly in a motor vehicle. Such unit assembly is shown in Fig. 5, and comprises a spider 16, the two bearings 24, the two clamp plates 64, and a securing element in the form of a wire 80 which is laced around hooks 82 defined between pairs of slots 84 in the flanges 72 of the clamp plates 64, extended across the rear faces of the clamp plates and around the sides of the bearing cups, brought through the spaces between the inner extremities of the bearing cup ears 48 and the outer periphery of the web portion of the spider 16, and then extended around the forward side of the spider and crossed at the center thereof as shown, the ends of the wire being secured together by twisting. This arrangement maintains the spider, bearing cup and clamp plate secured together in a unit assembly which can be handled during shipment and assembly in a completed joint without danger of any of the parts becoming displaced. The securing wire 80 is arranged so as to permit the unit to be attached to the yoke 12 while the parts are still held together thereby, and is adapted to be readily removed after the parts have been assembled to the yoke 12, by simply severing the wire and pulling it through the notches 84. In this respect, the invention achieves a distinct advantage in preventing any possibility of foreign matter entering the bearing cups during handling or shipment, and facilitates the final assembly of the joint in a motor vehicle by maintaining the parts in proper assembled relationship to each other during the preliminary states of such assembly. The arrangement has the further advantage of being simple and inexpensive. It was conceived after many other contemplated methods of securing the parts together in assembled relationship were discarded.

While I have described my invention in connection with one specific embodiment thereof, it is to be understood that this is by way of illustration and not by way of limitation, and the scope of my invention is defined solely by the appended claims which should be construed as broadly as the prior art will permit.

I claim:

1. In a universal joint and brake drum assembly, a brake drum having a web formed with a central opening, a yoke having a hub received in said opening and an arm located against the face of said web, a trunnion bearing having circumferentially extending ears in contact with the face of said arm opposite said web, a clamp plate having portions overlying said ears, and securing elements extending through said web, said arm, and said clamp plate, and securing them in assembled relationship with said ears clamped between said clamp plate and said arm.

2. A universal joint and brake drum assembly as defined in claim 1, wherein said securing elements are spaced beyond the ends of said ears.

3. A universal joint and brake drum assembly as defined in claim 1, wherein said bearing has a bearing cup portion projecting on one side of the plane of said ears and said clamp plate is arch-shaped, including an intermediate region located radially beyond the end of said cup portion and radially inwardly extended end arms embracing said bearing cup portions and engaging said ears.

4. A universal joint adapted to be assembled with a brake drum having a centrally apertured web portion, comprising a yoke having a hub receivable in said opening, and an arm having a forward face adapted to locate against the rear face of said web portion, a trunnion bearing having a pair of ears in contact with a rear face of said arm and having a bearing portion extending rearwardly from the plane of said ears, a clamp plate of arch shape having an intermediate region lying radially beyond said bearing and having radially inwardly projecting end arms embracing said bearing and overlying said ears, and securing elements adapted to extend through said end arms, said yoke arm and the web of said brake drum for securing all in assembled relationship with the ears clamped between said end arms and said rear face of the yoke arm.

5. A universal joint as defined in the preceding claim, wherein said securing elements are located beyond the ends of each ears.

6. The universal joint as defined in claim 4, wherein the periphery of said yoke arm is arcuate to match the contour of said brake drum, and wherein the peripheral region of the clamp plate is arcuate and formed with a flange locating against the rear face of said yoke arm at the periphery thereof.

7. A universal joint as defined in claim 1, wherein said yoke arm is formed in its peripheral region with an axially offset shoulder against which the outer extremities of said ears are piloted.

8. In a universal joint, a yoke including an arm formed with an axially facing surface the peripheral region of which is projected axially to form an overhanging piloting shoulder, a trunnion bearing including a pair of ears formed to locate against said surface and against said shoulder, and including a bearing portion projecting from the plane of said ears, axially of the yoke axis, a clamp plate of arch shape including an intermediate region lying radially beyond said bearing portion and end arms projecting radially inwardly, embracing said bearing portion and overlying said ears, and securing elements extended through said end arms and through said yoke arm for clamping said ears against said surface.

9. A universal joint as defined in the preceding claim, wherein said end arms include portions projecting circumferentially beyond the ends of said ears and the securing elements are extended through said projecting portions clearing said ears.

ARCHIBALD A. WARNER.